Sept. 29, 1942.  K. MEER  2,297,233
SPEED WARNING SIGNAL
Filed Jan. 5, 1939
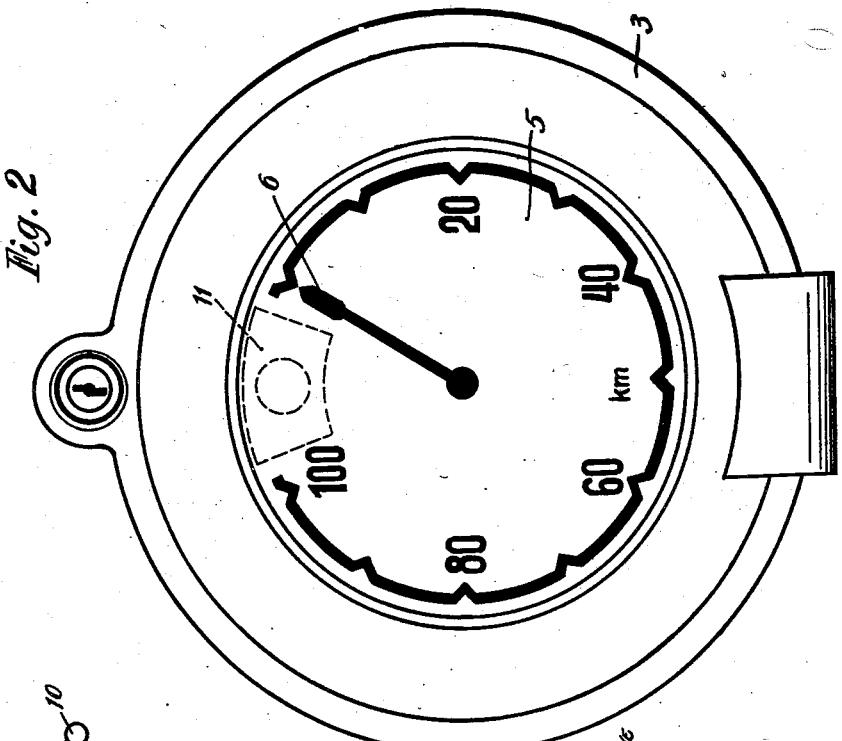
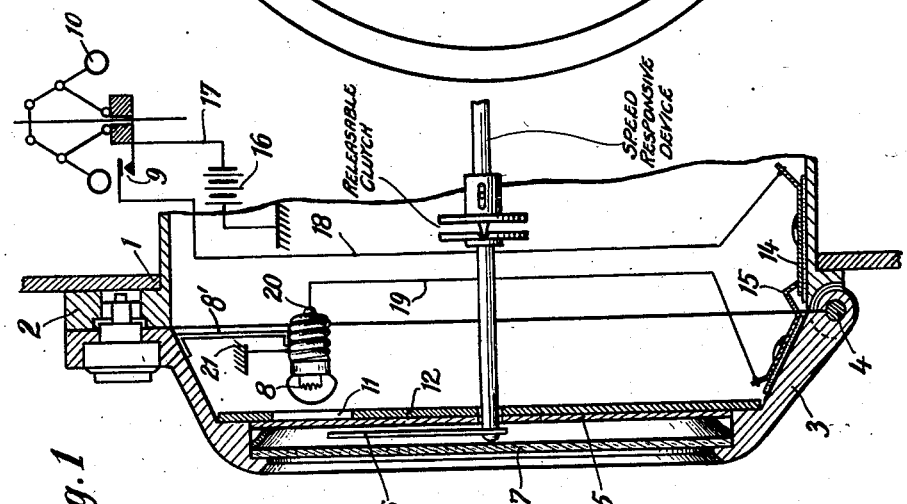
Inventor: Karl Meer,
Attorney: Harold D. Penney Patented Sept. 29, 1942

2,297,233

UNITED STATES PATENT OFFICE 2,297,233

SPEED WARNING SIGNAL

Karl Meer, Villingen, Schwarzwald, Germany; vested in the Alien Property Custodian Application January 5, 1939, Serial No. 249,430 In Germany July 22, 1938

2 Claims. (Cl. 177—311.5)

This invention relates to indicating apparatus for use on vehicles, for example to recording speedometers (tachographs). At the present time instruments of this nature are mounted in the dashboard of the vehicle. In order that the scale of the instrument or the chart or the like on which the record is made may be easily accessible the instrument is provided with a hinged cover. After opening the cover the chart or the like can be removed from the instrument and replaced by a new one.

In indicating instruments of this kind provision should be made for a good illumination of the scale or of the chart or the like on which the record is made. This is effected, in accordance with the present invention, by fitting an incandescent lamp, for illuminating the scale or the like, in the hinged cover of the apparatus. The arrangement must then be such that a good electrical connection is ensured between the current conducting parts in the movable cover and the terminals in the fixed casing. To this end contacts which resiliently coact when the cover is closed are fitted on the one hand in the casing and on the other hand in the cover of the apparatus. When the cover is closed these contacts effect the conduction of current between the current conducting parts in the casing and those in the cover, whereas, when the cover is opened, the current conducting parts provided in the cover are without current.

In instruments of the kind set forth it has also been found useful to indicate unpermissible operating conditions, for example excessively high speeds of the vehicle or excessively high speeds of revolution of the engine, by an optical signal which is given to the driver. Preferably, the signal lamp which is used for this purpose is also fitted in the hinged cover in order to illuminate a sign which is as near as possible to the scale of the apparatus.

Further details of the new apparatus will appear from the following description and the accompanying drawing which illustrates two examples of an instrument in accordance with the present invention. In the drawing:

Figure 1 is a section through the front part of the casing and the cover of a speedometer.

Figure 2 is a front elevation of the instrument showing the scale.

Referring to Figures 1 and 2 of the drawing, the casing 2 of the instrument is mounted in the dashboard 1 of the vehicle. In the casing is fitted a speed indicating mechanism of a kind known per se and which is not illustrated in detail. A cover 3 is connected by a hinge 4 to the casing 2. A pointer 6 which is driven through the agency of a coupling, similar to that shown in my Patent No. 2,244,653 issued June 3, 1941, from the speed indicating mechanism is fitted in the casing 2 and moves over a scale 5. The scale 5 is covered by a glass window 7.

When the speed of the vehicle or the speed of revolution of the engine increases to an unpermissible extent the circuit of a signal lamp 8, which may be mounted on the cover 3 as by the bracket 8', is closed at a contact 9 through the agency of a speed-responsive device 10 which is illustrated diagrammatically. The light emitted by the lamp 8 is then visible through an aperture 11 in a metal plate 12 which carries the scale, the scale 5 which is made of transparent material being illuminated in the vicinity of the aperture 11.

In order that the light signal may also be easily recognized in the daytime the signal lamp 8 is fitted in the immediate vicinity of the part of the scale to be illuminated. If a contrast is desired between the illuminated part and the remaining parts of the scale it is advantageous to give the rays of light emitted by the signal lamp a colour which differs from that of the scale. Thus, if the scale is white the illuminated part, for example, may be illuminated with red or green light.

The conduction of the electric current to the signal lamp in the cover is effected by means of an insulated contact plate 14 which is fixed in the casing 2 and a resilient contact 15 which is fixed in the cover and insulated therefrom, and, when the cover 3 is closed, makes contact with the plate 14. The current then flows from one pole of the battery 16 through the lead 17, the contact 9 of the speed responsive device and the lead 18 to the contact plate 14 and also over the spring contact 15 and the lead 19 to the lamp terminal 20. The other lamp connection is made as usual to the metal of the casing as diagrammatically indicated by a ground 21.

The arrangement which has been described has the advantage that when the cover 3 is open the lead 19 in the cover carries no voltage and short circuits are therefore avoided when the signal lamp 8 is replaced.

I claim:

1. An indicating instrument comprising a casing; a cover therefor having a window and a glass therein; a plate spaced behind the window and having an aperture therein; a transparent dial sheet on the front face of the plate and having a scale disposed nearly around the peripheral margin thereof leaving a space between the ends of the scale at said aperture; a pointer between said scale and glass and associated with the scale; a speedometer operatively connected to the pointer, a signal lamp behind said aperture; a source of current; and speed controlled means for at times connecting said lamp to said source.

2. An instrument as in claim 1, said scale being white, and said signal lamp being colored and adapted when lighted to serve the multiple function of brightly illuminating a spot of said transparent sheet at the aperture to give a vivid contrasting visual signal through the glass that the control means is controlling, and of causing part of the colored light to be reflected by the glass upon the indicator and white scale to cause the entire white scale to reflect the colored light and appear to be colored to give a prominent vivid indication over the whole scale that the control means is controlling and to show why it is controlling.

KARL MEER.